(12) United States Patent
Zhu (10) Patent No.: US 12,142,199 B2
(45) Date of Patent: Nov. 12, 2024

(54) RECOGNITION APPARATUSES, RECOGNITION METHODS, AND ELECTRONIC DEVICES CAPABLE OF NOT REDUCING SCREEN-TO-BODY

(71) Applicant: HUIZHOU TCL MOBILE COMMUNICATION CO., LTD., Guangdong (CN)

(72) Inventor: Jianfeng Zhu, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/347,601

(22) Filed: Jul. 6, 2023

(65) Prior Publication Data

US 2023/0351950 A1 Nov. 2, 2023

Related U.S. Application Data

(63) Continuation of application No. PCT/CN2021/075584, filed on Feb. 5, 2021.

(30) Foreign Application Priority Data

Jan. 7, 2021 (CN) .......................... 202110019111.7

(51) Int. Cl.
*G09G 3/32* (2016.01)
*G06F 3/041* (2006.01)

(52) U.S. Cl.
CPC ............ *G09G 3/32* (2013.01); *G06F 3/0412* (2013.01)

(58) Field of Classification Search
CPC .. G09G 3/32; G09G 2360/145; G06F 3/0412; Y02E 10/549; G06V 40/1341; G06V 40/1318; G06V 40/13
See application file for complete search history.

(56) References Cited

U.S. PATENT DOCUMENTS

| 2007/0295973 A1* | 12/2007 | Jinbo | .................. H01L 27/1266 257/88 |
| 2019/0019850 A1* | 1/2019 | Xu | .......................... G02B 27/30 |
| 2019/0102038 A1 | 4/2019 | Uehara et al. | |
| 2019/0332842 A1 | 10/2019 | Zhou | |
| 2020/0035764 A1* | 1/2020 | Chang | .................. H10K 50/115 |

(Continued)

FOREIGN PATENT DOCUMENTS

| CN | 105975963 A | 9/2016 |
| CN | 106298859 A | 1/2017 |

(Continued)

OTHER PUBLICATIONS

International Search Report in International application No. PCT/CN2021/075584,mailed on Sep. 26, 2021.

(Continued)

*Primary Examiner* — Rodney Amadiz
(74) *Attorney, Agent, or Firm* — PV IP PC; Wei Te Chung (57) ABSTRACT

A recognition apparatus includes a recognition layer and a light-emitting panel disposed on the recognition layer. The recognition layer is configured to recognize an object that contacts the light-emitting panel based on light that is emitted by the light-emitting panel in response to contact with the object and reflected by the object to the recognition layer.

16 Claims, 2 Drawing Sheets

(56) References Cited

U.S. PATENT DOCUMENTS

2020/0133414 A1   4/2020 Lee
2021/0357608 A1 * 11/2021 Tang ..................... H10K 59/65

FOREIGN PATENT DOCUMENTS

| | | |
|---|---|---|
| CN | 107886031 A | 4/2018 |
| CN | 208654763 U | 3/2019 |
| CN | 109685003 A | 4/2019 |
| CN | 109697396 A | 4/2019 |
| CN | 109858398 A | 6/2019 |
| CN | 110164922 A | 8/2019 |
| WO | WO-2019233135 A1 * 12/2019 | ........... G06F 3/0412 |

OTHER PUBLICATIONS

Written Opinion of the International Search Authority in International application No. PCT/CN2021/075584, mailed on Sep. 26, 2021.
1st Chinese Office Action issued in corresponding Chinese Patent Application No. 202110019111.7 dated Dec. 12, 2023, pp. 1-6.
2nd Chinese Office Action issued in corresponding Chinese Patent Application No. 202110019111.7 dated Apr. 3, 2024, pp. 1-6.
Rejection decision issued in corresponding Chinese Patent Application No. 202110668051.1 dated Jun. 28, 2024, pp. 1-6.

* cited by examiner

RECOGNITION APPARATUSES, RECOGNITION METHODS, AND ELECTRONIC DEVICES CAPABLE OF NOT REDUCING SCREEN-TO-BODY

CROSS-REFERENCE TO RELATED APPLICATIONS

This application is a continuation of International Application No. PCT/CN2021/075584, filed on Feb. 5, 2021, which claims priority to Chinese Patent Application No. 202110019111.7, filed on Jan. 7, 2021. The disclosures of the above applications are incorporated herein by reference in their entireties.

TECHNICAL FIELD

The present disclosure relates to object recognition technologies, and more particularly, to recognition apparatuses, recognition methods, and electronic devices.

BACKGROUND

With the popularization of application of fingerprint recognition in mobile phones, a fingerprint module is implanted into more and more electronic devices requiring the fingerprint recognition. However, for implanting the fingerprint module, a structure of a mobile phone must leave space for the fingerprint module, and a structure of a display screen of the mobile phone needs to be redesigned. This will result in inevitable effect on an overall design of the mobile phone, and higher design requirement for the display screen especially in a case where a high screen-to-body ratio of the mobile phone is desired.

SUMMARY

In view of the above, according to one or more embodiments of the present disclosure, a recognition apparatus includes: a recognition layer; and a light-emitting panel disposed on the recognition layer; wherein the recognition layer is configured to recognize an object that contacts the light-emitting panel based on light that is emitted by the light-emitting panel in response to contact with the object and reflected by the object to the recognition layer.

According to one or more embodiments of the present disclosure, a recognition apparatus includes: a recognition layer including a sensing layer and a drive circuit connected to the sensing layer; and an electroluminescent panel disposed on the recognition layer. The recognition layer is configured to recognize an object that contacts the electroluminescent panel based on light that is emitted by the electroluminescent panel in response to contact with the object and reflected by the object to the recognition layer.

According to one or more embodiments of the present disclosure, a recognition method implemented by the recognition apparatus as described above includes: when an object to be recognized contacts an electroluminescent panel, emitting light by the electroluminescent panel; and reflecting the light by the object to be recognized, and then recognizing the light by the recognition layer.

According to one or more embodiments of the present disclosure, an electronic device includes the recognition apparatus as described above.

DETAILED DESCRIPTION

Some embodiments of the present disclosure will be described in detail below with reference to the drawings. The embodiments are provided for illustrative purposes only and not intended to limit the scope of the present disclosure.

In a present mobile phone, a fingerprint module generally needs to be implanted into a display to perform fingerprint recognition. However, implanting of the fingerprint module will bring about an unobstructed change to a structure of the display of the mobile phone. The present embodiment provides a recognition apparatus. Referring to FIG. 1 to FIG. 4, the recognition apparatus includes a recognition layer 10 including a sensing layer 11 and a drive circuit 12 connected to the sensing layer 11; and an electroluminescent panel 20 disposed on the recognition layer 10. The recognition layer 10 is configured to recognize an object that contacts the electroluminescent panel 20 based on light that is emitted by the electroluminescent panel 20 in response to contact with the object and reflected by the object to the recognition layer 10.

Figure 1:
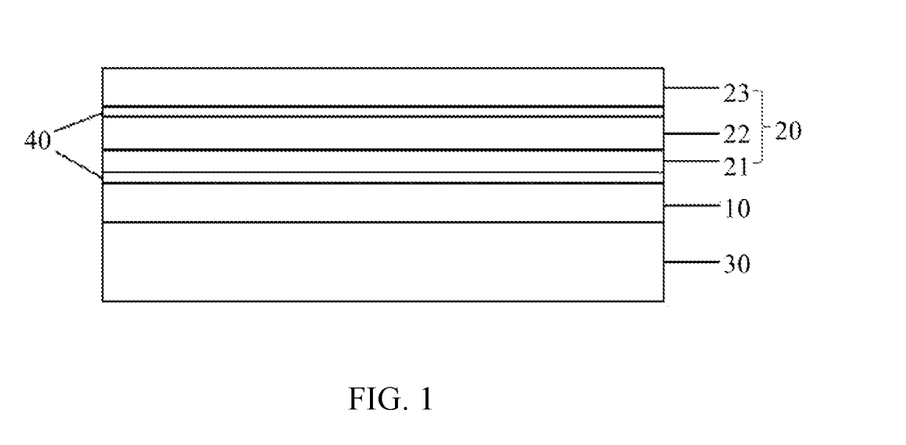
FIG. 1 is a schematic structural diagram of a recognition apparatus according to one or more embodiments of the present disclosure.

Specifically, the electroluminescent panel 20 is configured to generate electroluminescence. An electroluminescence principle is: generating an electric field by applying voltages to two electrodes of a light-emitting center; exciting electrons by the electric field when a voltage of the electric field reaches a threshold value; and injecting the excited electrons into the light-emitting center, resulting in transition, change, and recombination of the electrons between the energy levels, so that the light is emitted. An electroluminescent material is provided in the electroluminescent panel 20. By applying a weak electric field to the electroluminescent material, the electroluminescent material can generate an electroluminescent phenomenon, thereby generating light. The recognition layer 10 is configured to recognize the reflected light, which is emitted by the electroluminescent panel 20 and then is reflected by the object. In the present embodiment, the electroluminescent panel 20 and the object can generate a weak electric field whose electric quantity is sufficient to inject excited electrons into the electroluminescent material to emit light. The electroluminescent panel 20 is a transparent panel, so that the reflected light can pass through the entire electroluminescent panel 20 and strikes the recognition layer 10. The light emitted by the electroluminescent panel 20 is reflected by a portion of the object that contacts with the electroluminescent panel 20 and detected by the recognition layer 10, and thus the object can be recognized. By applying the recognition apparatus of the present disclosure to a touch control display, there is no need to redesign a structure of the touch control display, and a fingerprint recognition apparatus is directly embedded in the touch control display, thereby realizing fingerprint recognition under a design condition of not reducing a screen-to-body ratio.

Figure 2:
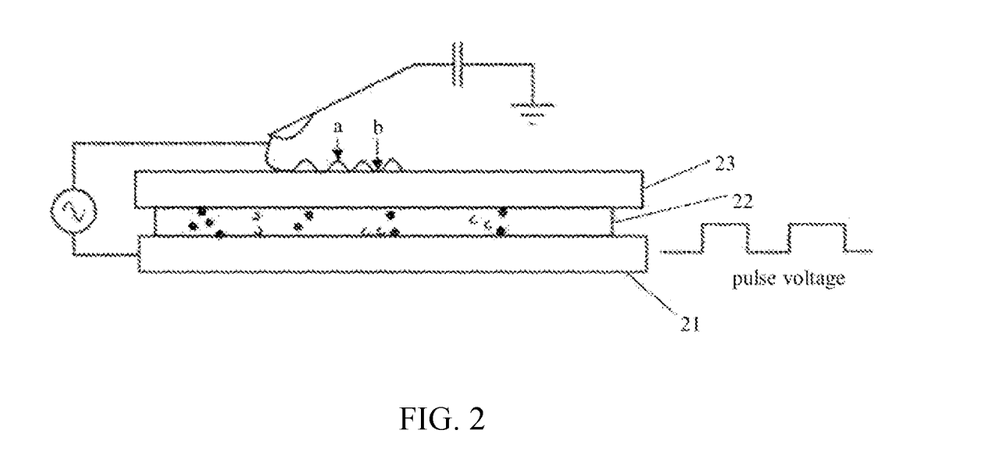
FIG. 2 schematically illustrates a light-emitting principle of an electroluminescent panel of a recognition apparatus according to one or more embodiments of the present disclosure.
Figure 3:
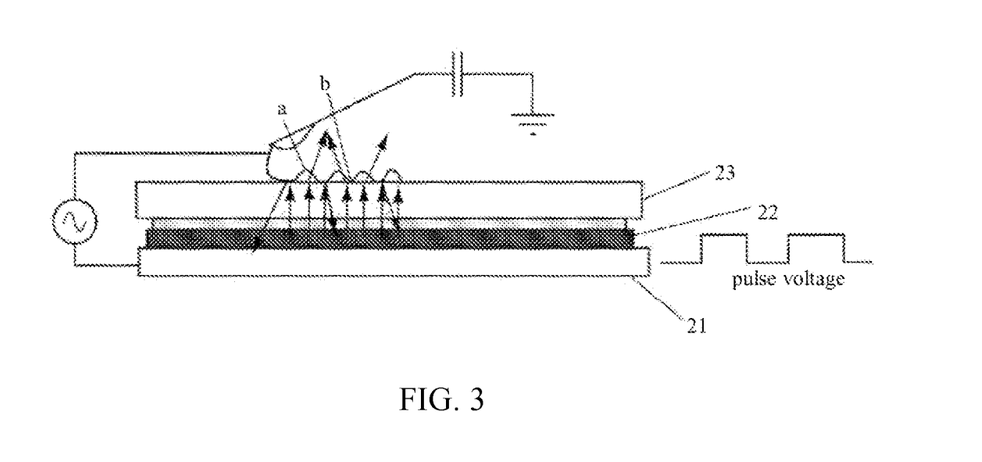
FIG. 3 schematically illustrates a recognition principle of a recognition apparatus according to one or more embodiments of the present disclosure.

Further, the recognition apparatus of the present embodiment is mainly applied to the fingerprint recognition. Referring to FIG. 2 and FIG. 3, a touch control principle of a capacitive touch control display is used. When a finger of a person touches a surface of the display, the person is grounded, and a certain amount of charges are transferred to the person, so that a weak electric field is generated between the finger and the touch control display. In the present embodiment, a weak electric field is generated between the electroluminescent panel 20 and the finger through the finger touching the electroluminescent panel 20, and the weak electric field is sufficient to cause the electroluminescent panel 20 to generate electroluminescence. A pattern of a human fingerprint is composed of a plurality of convex parts a and concave parts b. When the finger contacts a cover plate 23, the convex parts a of the finger contacts a surface of the cover plate 23 and the concave parts b of the finger does not contact the cover plate 23. After the electroluminescent panel 20 generates light, the light propagates toward the cover plate 23. A part of the propagated light contacts the convex parts a of the finger, and the other part of the light is emitted from the electroluminescent panel 20, enters into the air, and is refracted. Even if the refracted light is reflected by the concave parts b of the finger and reenters the electroluminescent panel 20, an intensity of the light finally entering the electroluminescent panel 20 is very weak. Light contacted by the convex parts a of the finger cannot pass through the cover plate 23 and is reflected due to being blocked by the convex parts a, and is received by the sensing layer 11 of the recognition layer 10 after passing through the transparent electroluminescent panel 20. Light directed to the concave parts b of the finger is emitted into the air from the cover plate 23 and is hardly reflected, and this part of light is hardly reflected and is received by the recognition layer 10. Therefore, the convex parts a and the concave parts b of the fingerprint can be recognized according to presence or strength of the emitted light. After receiving the reflected light, the sensing layer 11 converts and processes the reflected light, so that the fingerprint can be recognized by software.

In one embodiment, the sensing layer 11 includes a photoelectric conversion material.

Specifically, the photoelectric conversion material is an energy conversion functional material capable of converting light energy into electric energy, and has a small width of a band gap between a valence band and a conduction band of electronic transition. Photons are interposed into hole electrons, so that electrons are in a conduction band layer to form an electron flow. The light reflected by the object passes through the transparent electroluminescent panel 20, is absorbed by the photoelectric conversion material in the sensing layer 11, and is converted into electric energy by the photoelectric conversion material (i.e., a light signal is converted into an electric signal). Since the reflected light may be strong or weak, a converted voltage may vary. Therefore, the object can be recognized by processing electric signals with different output voltages from the drive circuit 12. Further, due to the need to recognize different shapes of the object, the photoelectric conversion material in the sensing layer 11 includes a plurality of photoelectric conversion materials independent of each other, which are configured to recognize different positions of the object. Specifically, a size, a quantity, and arrangement of each of the photoelectric conversion materials may be determined according to the shape of the object. For example, when the object is a fingerprint, what needs are the convex parts a and the concave parts b on the finger, and the size(s) of the photoelectric conversion materials can be designed to be smaller than a width and spacing of lines of the fingerprint, so that information of the convex parts a and the concave parts b of the finger can be acquired. Each of the photoelectric conversion materials need an individual drive, thus each of the photoelectric conversion materials is connected to one drive circuit 12. Different photoelectric conversion materials may not absorb light or may absorb light with different intensities, thus voltage output terminals of some drive circuits 12 have no voltage output and voltage output terminals of some drive circuits 12 output different voltage values, thereby obtaining a plurality of different electrical signals. Since the convex parts a of the finger can reflect almost all of the light emitted by the electroluminescent panel 10, and the concave parts b of the finger can hardly reflect the light emitted by the electroluminescent panel 10, a photoelectric conversion material under a convex part a of the finger can absorb light and generate and output an electric signal, and a photoelectric conversion material under a concave part b can hardly absorb light and cannot generate and output an electric signal.

Further, the photoelectric conversion material may include but is not limited to a III-V element compound, monocrystalline silicon, or an organic perovskite material.

Specifically, different photoelectric conversion materials have different photoelectric conversion properties, and selecting a suitable photoelectric conversion material can improve sensitivity of the sensing layer 11. When energy irradiated by light hitting on a photoelectric conversion material layer reaches a width of a band gap of the photoelectric conversion material, there may be an electron transition on a valence band of the photoelectric conversion material, so that carriers on a conduction band of the photoelectric conversion material are increased and a current of the photoelectric conversion material is increased. When an intensity of light is relatively high, more electrons can jump to the conduction band, and the generated current is high. When the intensity of light is relatively weak, less electrons can jump to the conduction band, and the generated current is small. The band gap between the valence band and the conduction band of the photoelectric conversion material selected in the present disclosure is small, and thus when electrons are excited, the electrons can easily jump from the valence band to the conduction band, so as to obtain a large detection range and high sensitivity. In an example, the present disclosure uses gallium arsenide as the photoelectric conversion material. Compared with other photoelectric conversion materials, a width of a band gap between a conduction band and a valence band of the gallium arsenide is smaller, and electrons on the valence band of the gallium arsenide can even be transferred by receiving small optical energy, thereby enlarging a light intensity detection range of the sensing layer 11.

Figure 4:
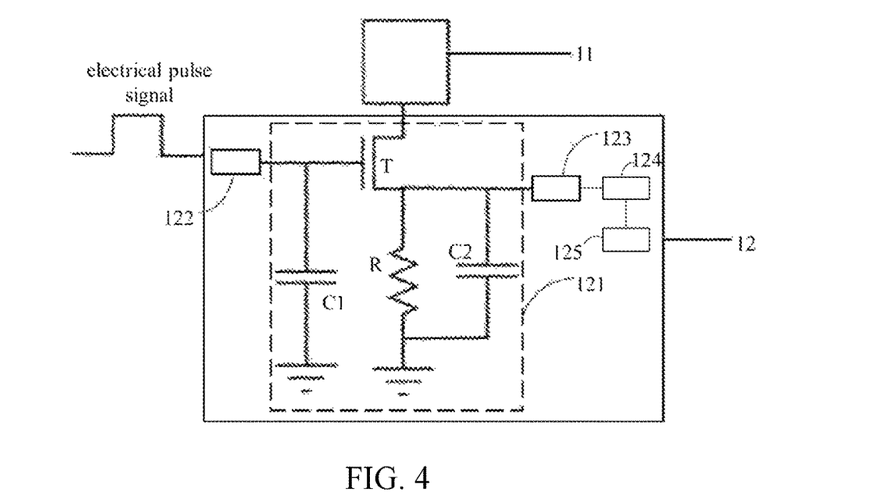
FIG. 4 is a schematic structural diagram of a drive circuit of a recognition apparatus according to one or more embodiments of the present disclosure.

In one embodiment, referring to FIG. 4, the drive circuit 12 includes a transistor module 121 connected to the sensing layer 11, a pulse input terminal 122 connected to the transistor module 121, and a signal output terminal 123 connected to the transistor module 121.

Specifically, for each drive circuit 12, the pulse input terminal 122 is configured to input an electrical pulse signal, such as a complementary metal oxide semiconductor (CMOS) drive pulse. The electric pulse signal is input to the pulse input terminal 122 to turn on a thin film transistor switch in the transistor module 121 to form a path. The photoelectric conversion material converts light energy into electric energy and energizes the circuit, and the voltage output terminal outputs the converted voltage to obtain an electric signal. Further, the transistor module 121 includes a thin film transistor T, a first resistor R, a first capacitor C1, and a second capacitor C2. The thin film transistor T has a first node connected to the photoelectric conversion material, a second node connected to the signal output terminal 123, and a third node connected to the pulse input terminal 122. The first node may be a drain node or a source node, the second node may be a source node or a drain node, and the third node may be a gate node. One terminal of the first resistor R is connected to the second node of the thin film transistor T, the other terminal of the first resistor R is connected to ground, and the thin film transistor T is connected in series with the first resistor R. Meanwhile, one terminal of the first capacitor C1 is connected to the pulse input terminal 122, the other terminal of the first capacitor C1 is connected to ground, one terminal of the second capacitor C2 is connected to the voltage output terminal, and the other terminal of the second capacitor C2 is connected to ground. The first capacitor C1 functions to stabilize an input drive pulse, and the second capacitor C2 functions to stabilize an output voltage, thereby ensuring circuit stability of the entire drive circuit 12. The drive circuit 12 of the present embodiment has a simple design, and may be designed to turn on or turn off the drive circuit 12 by switching of the thin film transistor T, so as to control opening and closing of the fingerprint recognition.

In one embodiment, referring to FIG. 1, the recognition apparatus further includes a display module 30 on which the recognition layer 10 is disposed. The transistor module 121 includes one or more thin film transistors. An aperture ratio of the thin film transistors is consistent with a pixel area of the display module 30.

Specifically, the recognition apparatus of the present embodiment can be used for under-screen fingerprint recognition of a display, the display module 30 is disposed below the recognition layer 10, and the display module 30 is used to display an image of the display. A plurality of pixels are arranged on the display module 30, and a displayed image of the display is formed by illuminating each pixel. Since the recognition layer 10 is disposed on the display module, the thin film transistors on the drive circuit 12 may affect a display effect of the pixels on the display module. In order not to affect the display effect of the display, arrangement of the thin film transistors in the drive circuit 12 and the aperture ratio of the thin film transistors are set so that the thin film transistors do not block the light emitted from the display module 30 from passing through the recognition layer 10. That is, each of the thin film transistors on the drive circuit 12 corresponds to one of the pixels on the display module 30. In other words, a number of the thin film transistors is the same as a number of the pixels on the display module 30, and thus a number of the photoelectric conversion materials is the same as a number of the pixels on the display module 30. Since a width of a pattern of the fingerprint is generally larger than a width of the pixels on the display, the number of the photoelectric conversion materials being the same as a number of the pixels on the display module 30 will not affect the fingerprint recognition. Meanwhile, the aperture ratio of the thin film transistors needs to be consistent with the pixel area of the display module 30, which ensures that the pixels of the display module 30 are not blocked by the thin film transistors.

Further, when the recognition apparatus of the present embodiment is applied to the touch control display, since a light source used by the recognition layer 10 to recognize the object is the electroluminescent material on an upper layer of the recognition layer 10 rather than a display light source from the display module 30, the present disclosure may unlock the touch control display in a black screen state in. When the touch control display needs to be unlocked, the finger is placed on the touch control display, and a weak electric field is generated between the finger and the touch control display. As long as an electric field is generated between the finger and the electrode layer, the electroluminescent material can generate light. Therefore, the touch control display can be unlocked directly when in the black screen state, without illuminating the touch control display, thereby omitting operations for illuminating the touch control display, such as pressing a screen lighting button or lifting the touch control display. Furthermore, the photoelectric conversion material and the electroluminescent material can be arranged on the entire display, so that the fingerprint recognition can be performed at any position of the display to perform a display unlocking operation. Thus, the touch control display does not need to display an unlocking position for unlocking the display, thereby greatly facilitating the screen unlocking operation of a user.

In one embodiment, the recognition layer 10 further includes: an analog-to-digital converter 124 connected to the signal output terminal 123 for converting a voltage signal from the signal output terminal into a digital signal; and a signal processor 125 connected to the analog-to-digital converter 124 for processing the digital signal to obtain a recognition result.

Figure 5:
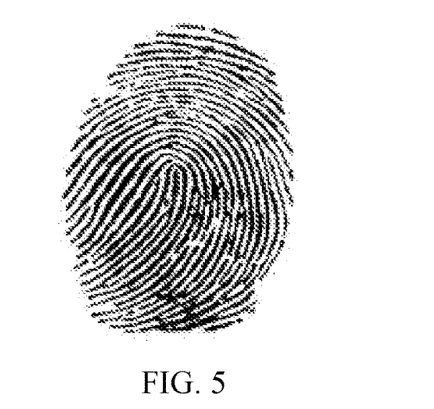
FIG. 5 illustrates a fingerprint image obtained by a recognition apparatus according to one or more embodiments of the present disclosure when used for fingerprint recognition.

Specifically, since the electrical signal cannot be directly processed by software, the analog-to-digital converter 124 is connected to the voltage output terminal. The analog-to-digital converter 124 converts the electrical signal output from the voltage output terminal into the digital signal. The digital signal can be processed by the software, so that the software can recognize the signal. The signal processor 125 is configured to process the digital signal processed by the analog-to-digital converter 124. The signal processor 125 receives signals transmitted from a plurality of different drive circuits 12, and processes the received signals in combination with a positioning method of the touch control display, so as to obtain the recognition result. Regarding the fingerprint recognition, referring to FIG. 5, the analog-to-digital converter 124 converts electrical signals transmitted from the plurality of different drive circuits 12 into a plurality of digital signals, and then transmits the digital signals to the signal processor 125. The signal processor 125 processes the plurality of digital signals and use grey scale values to indicate the plurality of digital signals. A place where a signal is generated has a larger grey scale value, and a place where no signal is generated has a smaller grey scale value. Further, each grey scale value is spliced in combination with the positioning method of a capacitive touch control display, so that a pattern is generated at a place where the electrical signals are generated, and no pattern is generated at a place where no electrical signal is generated, thereby recognizing the fingerprint and generating a fingerprint image.

In one embodiment, referring to FIG. 1, the electroluminescent panel 20 includes a conductive base plate 21 disposed on the recognition layer 10, the conductive base plate 21 having an electrode layer; an electroluminescent layer 22 disposed on the conductive base plate 21 and connected to the electrode layer; and a cover plate 23 disposed on the electroluminescent layer 22.

Figure 6:
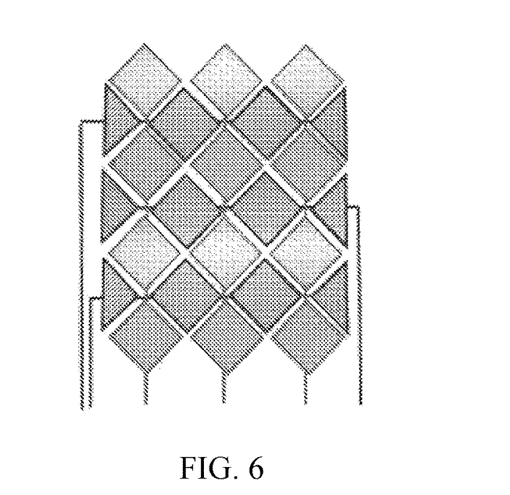
FIG. 6 schematically illustrates arrangement of electrodes on a conductive base plate of a recognition apparatus according to one or more embodiments of the present disclosure.

Specifically, referring to FIG. 6, a conventional capacitive touch control panel is provided with the conductive base plate 21 under the cover plate 23. The conductive base plate 21 has electrode wiring. Diamond-shaped regions in FIG. 6 are a transparent anode. A material of the anodes is usually an indium tin oxide (ITO) conductive material. When the finger touches the cover plate 23, the electrode layer and the finger can generate a weak electric field to recognize an actual touch position of the finger on the touch control display. The electric field excites electrons in the electroluminescent material, and there are electron transition, change, recombination between energy levels, which results in luminescence. In this embodiment, the electroluminescent layer 22 is added between the cover plate 23 and a conductive anode base plate. The cover plate 23 is connected to the electroluminescent layer 22 through an adhesive layer 40. The conductive base plate 21 is also connected to the recognition layer 10 through the adhesive layer 40. The adhesive layer 40 may be a transparent adhesive layer. Referring to FIG. 2, when the finger contacts the cover plate 23, after scanning of the electrode layer (as a touch control electrode) below the cover plate 23 contacted by the finger, a pulse voltage is applied to the entire electrode layer. Since the human body is similarly grounded, a weak electric field is generated between the electrode layer and the finger. After the electric field between the finger and the electrode is generated, electrons are continuously injected into the electroluminescent material. Through continuously injecting the electrons into a hole region of the electroluminescent material, a guide current is formed. Continuous injection of electron energy into the hole region of the electroluminescent material causes photons of the electroluminescent material to generate energy transitions of the photons, and the photons enter the conduction band layer of the electroluminescent material and is emitted in a form of light, so as to drive the electroluminescent material to emit the light towards the upper glass cover plate 23. When contacting the convex parts a on the fingerprint, the light is reflected and is received by the recognition layer 10. While, other light is hardly reflected due to passing through the cover plate 23 toward the air. Even if the other light is reflected by the concave parts b of the finger and returns to the cover plate 23, an intensity of the other light is greatly reduced. Thus, the fingerprint may be recognized according to whether the recognition layer 10 receives the light and an intensity of the received light. Further, the electroluminescent layer 22 includes indium phosphide or indium gallium arsenide phosphide, and the electroluminescent layer 22 has a thickness of 10 nm~1 µm, so that the electroluminescent material is a transparent material.

In one embodiment, the present embodiment further provides a recognition method implemented by the recognition apparatus as described above. The recognition method includes:

S10: when the object contacts the electroluminescent panel 20, emitting light by the electroluminescent: panel 20; and S20: reflecting the by the object, and then recognizing the light by the recognition layer 10.

Specifically, the recognition method of the present embodiment is realized by using the recognition apparatus as described above, which includes the recognition layer 10 and the electroluminescent panel 20 disposed on the recognition layer 10. The electroluminescent panel 20 is a transparent panel. Through the object contacting the electroluminescent panel 20, the electroluminescent panel 20 and the object can generate a weak electric field, so that the electroluminescent panel 20 emits light. The light emitted by the electroluminescent panel 20 is reflected by a portion of the object that contacts with the electroluminescent panel 20 and detected by the recognition layer 10, and thus the object can be recognized. By applying the recognition apparatus of the present disclosure to a touch control display, there is no need to redesign a structure of the touch control display, and a fingerprint recognition apparatus is directly embedded in the touch control display, thereby realizing fingerprint recognition under a design condition of not reducing a screen-to-body ratio.

The recognition method of the present embodiment is mainly applied to the fingerprint recognition. When a finger contacts the cover plate 23, the convex parts a of the finger contacts the surface of the cover plate 23 and the concave parts b of the finger does not contact the cover plate 23. After the electroluminescent panel 20 generates light, the light propagates toward the cover plate 23. A part of the propagated light contacts the convex parts a of the finger, and the other part of the light is emitted from the electroluminescent panel 20, enters into the air, and is refracted. Even if the refracted light is reflected by the concave parts b of the finger and reenters the electroluminescent panel 20, an intensity of the light finally entering the electroluminescent panel 20 is very weak. Light contacted by the convex parts a of the finger cannot pass through the cover plate 23 and is reflected due to being blocked by the convex parts a, and is received by the sensing layer 11 of the recognition layer 10 after passing through the transparent electroluminescent panel 20. Light directed to the concave parts b of the finger is emitted into the air from the cover plate 23 and is hardly reflected, and this part of light is hardly reflected and is received by the recognition layer 10. Therefore, the convex parts a and the concave parts b of the fingerprint can be recognized according to presence or strength of the emitted light.

Further, the operation S10 may specifically include:

S11: when the object contacts the cover plate 23, generating a weak electric field by the object and the conductive base plate 21; and S12: generating electroluminescence by the electroluminescent panel 20 through the weak electric field, and emitting the light by the electroluminescent panel 20.

Specifically, when the finger touches the cover plate 23, the electrode layer and the finger can generate a weak electric field to recognize an actual touch position of the finger on the touch control display. The electric field excites electrons in the electroluminescent material, and there are electron transition, change, recombination between energy levels, which results in luminescence. In this embodiment, the electroluminescent layer 22 is added between the cover plate 23 and a conductive anode base plate. Referring to FIG. 2, when the finger contacts the cover plate 23, after scanning of the electrode layer (as a touch control electrode) below the cover plate 23 contacted by the finger, a pulse voltage is applied to the entire electrode layer. Since the human body is similarly grounded, a weak electric field is generated between the electrode layer and the finger. After the electric field between the finger and the electrode is generated, electrons are continuously injected into the electroluminescent material. Through continuously injecting the electrons into a hole region of the electroluminescent material, a guide current is formed. Continuous injection of electron energy into the hole region of the electroluminescent material causes photons of the electroluminescent material to generate energy transitions of the photons, and the photons enter the conduction band layer of the electroluminescent material and is emitted in a form of light, so as to drive the electroluminescent material to emit the light towards the upper glass cover plate 23. When contacting the convex parts a on the fingerprint, the light is reflected and is received by the recognition layer 10. While, other light is hardly reflected due to passing through the cover plate 23 toward the air. Even if the other light is reflected by the concave parts b of the finger and returns to the cover plate 23, an intensity of the other light is greatly reduced. Thus, the fingerprint may be recognized according to whether the recognition layer 10 receives the light and an intensity of the received light.

Further, the operation S20 includes:

S21: propagating the light to the object, reflecting the light by the object to generate reflected light, and receiving the reflected light by the sensing layer 11;

S22: converting the reflected light into an electric signal by the sensing layer 11;

S23: converting the electric signal into a digital signal by a digital-to-analog converter; and S24: processing the digital signal by the signal processor 125 to obtain a recognition result.

Specifically, a material of the sensing layer 11 is a photoelectric conversion material. The light reflected by the object passes through the transparent electroluminescent panel 20, is absorbed by the photoelectric conversion material in the sensing layer 11, and is converted into electric energy by the photoelectric conversion material (i.e., a light signal is converted into an electric signal). Since the reflected light may be strong or weak, a converted voltage may vary.

Further, due to the need to recognize different shapes of the object, the photoelectric conversion material in the sensing layer 11 includes a plurality of photoelectric conversion materials independent of each other, which are configured to recognize different positions of the object. Specifically, a size, a quantity, and arrangement of each of the photoelectric conversion materials may be determined according to the shape of the object. Each of the photoelectric conversion materials need an individual drive, thus each of the photoelectric conversion materials is connected to one drive circuit 12. Different photoelectric conversion materials may not absorb light or may absorb light with different intensities, thus voltage output terminals of some drive circuits 12 have no voltage output and voltage output terminals of some drive circuits 12 output different voltage values, thereby obtaining a plurality of different electrical signals.

Further, since the electrical signal cannot be directly processed by software, the analog-to-digital converter 124 is connected to the voltage output terminal. The analog-to-digital converter 124 converts the electrical signal output from the voltage output terminal into the digital signal. The digital signal can be processed by the software so that the software can recognize the signal. The signal processor 125 is configured to process the digital signal processed by the analog-to-digital converter 124. The signal processor 125 receives signals transmitted from a plurality of different drive circuits 12, and processes the received signals in combination with a positioning method of the touch control display, so as to obtain the recognition result.

In one embodiment, the present embodiment further provides an electronic device including the recognition apparatus as described above.

Specifically, the electronic device may be any device having a touch control display, including mobile phone terminals, tablet computers, touch screen computers. The electronic device may be any device having a touch control function. The present disclosure may unlock the touch control display in a black screen state in. When the touch control display needs to be unlocked, the finger is placed on the touch control display, and a weak electric field is generated between the finger and the touch control display. As long as an electric field is generated between the finger and the electrode layer, the electroluminescent material can generate light. Therefore, the touch control display can be unlocked directly when in the black screen state, without illuminating the touch control display, thereby omitting operations for illuminating the touch control display, such as pressing a screen lighting button or lifting the touch control display. Furthermore, the photoelectric conversion material and the electroluminescent material can be arranged on the entire display, so that the fingerprint recognition can be performed at any position of the display to perform a display unlocking operation. Thus, the touch control display does not need to display an unlocking position for unlocking the display, thereby greatly facilitating the screen unlocking operation of a user.

In summary, the present disclosure provides a recognition apparatus, a recognition method, and an electronic device. The recognition apparatus includes: a recognition layer including a sensing layer and a drive circuit connected to the sensing layer; and an electroluminescent panel disposed on the recognition layer. When an object presses the electroluminescent panel, the electroluminescent panel generates electroluminescence, and light emitted by the electroluminescent panel is reflected by the object and then recognized by the recognition layer. Through the object touching the electroluminescent panel, the electroluminescent panel and the object may generate a weak electric field so that the electroluminescent panel emits light. The light emitted by the electroluminescent panel is reflected by a portion of the object that contacts with the electroluminescent panel and detected by the recognition layer, and thus the object can be recognized. By applying the recognition apparatus of the present disclosure to a touch control display, there is no need to redesign a structure of the touch control display, and a fingerprint recognition apparatus is directly embedded in the touch control display, thereby realizing fingerprint recognition under a design condition of not reducing a screen-to-body ratio.

It is to be understood that the present disclosure is not limited to the above examples. Various modifications or variations that may occur to those of ordinary skill in the art based on the teachings of the present disclosure shall fall within the scope of the appended claims.

What is claimed is:

1. A recognition apparatus, comprising:
   a recognition layer comprising a sensing layer and a drive circuit connected to the sensing layer; and
   an electroluminescent panel disposed on the recognition layer,
   wherein the recognition layer is configured to recognize an object that contacts the electroluminescent panel based on light that is emitted by the electroluminescent panel in response to contact with the object and reflected by the object to the recognition layer;

the sensing layer comprises a photoelectric conversion material;
the object comprises a fingerprint; and
the electroluminescent panel comprises:
a conductive base plate disposed on the recognition layer, the conductive base plate having an electrode layer;
an electroluminescent layer disposed on the conductive base plate and connected to the electrode layer; and
a cover plate disposed on the electroluminescent layer;
wherein the drive circuit comprises:
a transistor module connected to the sensing layer, wherein the transistor module comprises:
a transistor comprising a gate, an input terminal connected to the sensing layer, and an output terminal;
a first resistor, connected to the output terminal of the transistor;
a first capacitor, connected to the gate of the transistor; and
a second capacitor, connected to the first resistor in parallel;
a pulse input terminal connected to the gate of the transistor; and
a signal output terminal connected to the output terminal of the transistor, wherein the pulse input terminal is configured to input an electrical pulse signal to turn on the transistor to form a path, and light energy is converted into electric energy; and
wherein the electroluminescent layer has a thickness of 10 nm~1 μm.

2. A recognition apparatus, comprising:
a recognition layer; and
a light-emitting panel disposed on the recognition layer,
wherein the recognition layer is configured to recognize an object that contacts the light-emitting panel based on light that is emitted by the light-emitting panel in response to contact with the object and reflected by the object to the recognition layer;
wherein the recognition layer comprises a drive circuit, and the drive circuit comprises:
a transistor module connected to the sensing layer, wherein the transistor module comprises:
a transistor comprising a gate, an input terminal connected to the sensing layer, and an output terminal;
a first resistor, connected to the output terminal of the transistor;
a first capacitor, connected to the gate of the transistor; and
a second capacitor, connected to the first resistor in parallel;
a pulse input terminal connected to the gate of the transistor; and
a signal output terminal connected to the output terminal of the transistor, wherein the pulse input terminal is configured to input an electrical pulse signal to turn on the transistor to form a path, and light energy is converted into electric energy; and
wherein the light-emitting panel is an electroluminescent panel, the electroluminescent panel comprises an electroluminescent layer, and the electroluminescent layer has a thickness of 10 nm~1 μm.

3. The recognition apparatus of claim 2, wherein the recognition layer comprises a sensing layer and the drive circuit connected to the sensing layer.

4. The recognition apparatus of claim 3, wherein the sensing layer comprises a photoelectric conversion material.

5. The recognition apparatus of claim 4, wherein the photoelectric conversion material comprises a III-V element compound, monocrystalline silicon, or an organic perovskite material.

6. The recognition apparatus of claim 4, wherein the transistor module comprises a thin film transistor having a first node connected to the photoelectric conversion material, a second node connected to the signal output terminal, and a third node connected to the pulse input terminal.

7. The recognition apparatus of claim 6, further comprising a display module on which the recognition layer is disposed.

8. The recognition apparatus of claim 7, wherein an aperture ratio of the thin film transistor is consistent with a pixel area of the display module.

9. The recognition apparatus of claim 2, wherein the recognition layer further comprises:
an analog-to-digital converter connected to the signal output terminal for converting a voltage signal from the signal output terminal into a digital signal; and
a signal processor connected to the analog-to-digital converter for processing the digital signal to obtain a recognition result.

10. The recognition apparatus of claim 2, wherein the electroluminescent panel further comprises:
a conductive base plate disposed on the recognition layer, the conductive base plate having an electrode layer;
the electroluminescent layer disposed on the conductive base plate and connected to the electrode layer; and
a cover plate disposed on the electroluminescent layer.

11. The recognition apparatus of claim 10, wherein the electroluminescent layer comprises indium phosphide or indium gallium arsenide phosphide.

12. The recognition apparatus of claim 10, wherein the electrode layer is an anode layer.

13. An electronic device comprising a recognition apparatus, the recognition apparatus comprising:
a recognition layer; and
a light-emitting panel disposed on the recognition layer,
wherein the recognition layer is configured to recognize an object that contacts the light-emitting panel based on light that is emitted by the light-emitting panel in response to contact with the object and reflected by the object to the recognition layer;
wherein the recognition layer comprises a drive circuit, and the drive circuit comprises:
a transistor module connected to the sensing layer, wherein the transistor module comprises:
a transistor comprising a gate, an input terminal connected to the sensing layer, and an output terminal;
a first resistor, connected to the output terminal of the transistor;
a first capacitor, connected to the gate of the transistor; and
a second capacitor, connected to the first resistor in parallel;
a pulse input terminal connected to the gate of the transistor; and
a signal output terminal connected to the output terminal of the transistor, wherein the pulse input terminal is configured to input an electrical pulse signal to turn on the transistor to form a path, and light energy is converted into electric energy; and
wherein the light-emitting panel is an electroluminescent panel, the electroluminescent panel comprises an electroluminescent layer, and the electroluminescent layer has a thickness of 10 nm~1 μm.

14. The electronic device of claim 13, wherein the recognition layer comprises a sensing layer and the drive circuit connected to the sensing layer.

15. The electronic device of claim 14, wherein the sensing layer comprises a photoelectric conversion material.

16. The electronic device of claim 15, wherein the photoelectric conversion material comprises a III-V element compound, monocrystalline silicon, or an organic perovskite material.

* * * * *